(12) United States Patent
Wakahoi et al.

(10) Patent No.: US 7,674,550 B2
(45) Date of Patent: Mar. 9, 2010

(54) FUEL CELL

(75) Inventors: Toshiya Wakahoi, Saitama (JP); Junichi Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 785 days.

(21) Appl. No.: 10/839,547

(22) Filed: May 4, 2004

(65) Prior Publication Data

US 2004/0224212 A1    Nov. 11, 2004

(51) Int. Cl.
*H01M 2/14* (2006.01)
*H01M 2/02* (2006.01)
*H01M 2/08* (2006.01)

(52) U.S. Cl. ............................. 429/38; 429/34; 429/35; 429/36

(58) Field of Classification Search .................. 429/38, 429/34, 35, 36
See application file for complete search history.

(56) References Cited

U.S. PATENT DOCUMENTS

| | | | |
|---|---|---|---|
| 6,187,464 B1 * | 2/2001 | Yasumoto et al. | 429/13 |
| 6,355,371 B1 | 3/2002 | Farkash et al. | |
| 6,440,597 B1 | 8/2002 | Mizuno | |
| 6,649,097 B2 * | 11/2003 | Sasaki et al. | 264/102 |
| 7,008,584 B2 * | 3/2006 | Inoue et al. | 264/154 |
| 7,063,911 B1 * | 6/2006 | Nagai et al. | 429/35 |
| 2003/0072988 A1 * | 4/2003 | Frisch et al. | 429/36 |
| 2003/0129474 A1 | 7/2003 | Kikuchi et al. | |

FOREIGN PATENT DOCUMENTS

| | | |
|---|---|---|
| CA | 2 442 067 | 9/2002 |
| DE | 199 60 516 | 7/2000 |
| DE | 102 60 626 | 7/2003 |
| JP | 10-74530 | 3/1998 |
| JP | 10-745530 | 3/1998 |
| JP | 11-129396 | 5/1999 |
| JP | 2000-033630 | 2/2000 |
| JP | 2000-133288 | 5/2000 |
| JP | 2000-182639 | 6/2000 |
| JP | 2001-185174 | 7/2001 |
| JP | 2001-283893 | 10/2001 |
| JP | 2001-332276 | 11/2001 |
| JP | 2002-042837 | 2/2002 |
| JP | 2002-158018 | 5/2002 |
| JP | 2002-198071 | 7/2002 |
| JP | 2002-237317 | 8/2002 |
| JP | 2003-229145 | 8/2003 |
| JP | 2004-207071 | 7/2004 |

* cited by examiner

*Primary Examiner*—Patrick Ryan
*Assistant Examiner*—Helen O Conley
(74) *Attorney, Agent, or Firm*—Hamre, Schumann, Mueller & Larson, P.C.

(57) ABSTRACT

A first seal member 50 is integrated with the surface 18a of a first metal separator 18, and is provided with a body base portion 58 having a trapezoidal-shaped cross-section and two protruded portions 60a and 60b integrated to the leading end of the body base portion 58, where said body base portion 58 is set to a height H1 for keeping a desired spring constant necessary for impact absorptions, and the protruded portions 60a and 60b are set to a height H2 for preventing the line pressure of the seal member from being abruptly changed and for keeping the strengths of the protruded portions 60a and 60b themselves.

11 Claims, 5 Drawing Sheets

FUEL CELL

BACKGROUND OF THE INVENTION

1. Field of the Invention

The present invention relates to a fuel cell which is comprised of an electrolyte/electrode structure having an electrolyte being arranged between a pair of electrodes, and separators which are stacked on the electrolyte/electrode structure, and include reaction gas passages for feeding the reaction gas in the surface direction of the electrodes, said reaction gas being provided from the reaction gas introducing communication holes to the reaction gas discharging communication holes of which gas flaw is extending at least in the stacking direction.

2. Description of the Related Art

In a solid polymer electrolyte fuel cell, for example, an 15 electrolyte/electrode structure, in which an anode electrode and a cathode electrode are juxtaposed on both sides of an electrolyte (or an electrolyte membrane) which is made of a polymer ion-exchange membrane (or an anode ion-exchange membrane), and said electrolyte/electrode structure is damped by said separators. The fuel cell of this kind is used as a fuel cell stack by stacking plural sets of the electrolyte/electrode structure and the separators for a predetermined number. In this fuel cell, the fuel gas fed to the anode electrode, such as a gas containing hydrogen in main (as will also be called the "hydrogen containing gas"), has its hydrogen ionized on an electrode catalyst so that the hydrogen ions migrate through the electrolyte toward the cathode electrode. The electrons generated during said process are extracted through an external circuit to be utilized as DC electric energy Moreover, since the cathode electrode is fed with an oxidizer gas such as a gas containing oxygen mainly or air (as will also be called the "oxygen, containing gas"), the hydrogen ions, the electrons and the oxygen are reacted with one another so as to produce water at the cathode electrode.

In the fuel cell of this kind, it is required for the fuel gas, the oxidizer gas and the coolant to flow air-tightly or liquid-tightly along their corresponding dedicated passages. Therefore, various seal members are usually interposed between the electrolyte/electrode structure and the separators. For example, the seal member of Patent Publication 1 (JP-A-2001-332276) is structured, as shown in FIG. 9, such that a base gasket 1 is made of an elastic material of a synthetic rubber material or synthetic resin material having a high hardness of 70 degrees to 90 degrees, and such that gaskets 2 of a synthetic rubber material having a low hardness of 30 degrees to 50 degrees are arranged on the compression surfaces of the base gasket 1.

According to Patent Publication 1, however, the seal members are assembled between the separators so that the number of assembling steps is increased, which ends up with lower workability in addition to the considerable difficulty in aligning the seal members. Moreover, since each seal member needs at least two sets of the sealing members on the both sides, which also raises a complicated structural problem.

In the method for manufacturing an integral seal type separator of Patent Publication 2 (JP-A-2002-237317), for example, there is disclosed a method of seal members being arranged on electrode reaction surfaces or outer surfaces of the communication holes, which are integrated with both sides of the separator body of the fuel cell.

This Patent Publication 2 is effective because it enables the seal members to be more precisely aligned and the number of the assembling steps can be significantly reduced, as compared to the cases of the seal members being arranged on both sides of the separator body, or coating the sealing material beforehand.

As for the seal members generally used in the related arts, they are formed into a hill-top shape (i.e., a lip shape). Therefore although the seal members are integrated with the separator body, as disclosed in Patent Publication 2, the sealing properties may be eventually deteriorated in case of mounting a fuel cell into the vehicle.

More specifically, the leading end portions of the seal members might be displaced by the vibrations generated during the running time or the shocks caused by an abrupt stopping or starting of the vehicle. In such a circumstance, it becomes difficult to keep the desired sealing properties due to the satisfactory contact area being not made. When the metal separators are used, especially, the deformation, warp or swelling may easily occur on the surfaces of the metal separators. However, the leading end portions of the seal members cannot be appropriately adjusted to the surface changes of the metal separators, which may raise a problem such that the sealing surface pressure needed for sealing function with the separator surfaces cannot be retained.

Moreover, when the stack is to be made by stacking a plurality of fuel cells, a displacement might occur readily at the leading end portions of the seal members. As a result, falling of the leading end portions of the seal members, dropping the surface pressure, reducing the contact area, or the like may occur, and it makes extremely difficult to keep the desired sealing properties.

SUMMARY OF THE INVENTION

The present invention has been achieved to solve the problems of those kinds as stated before, and it is an object in this invention to provide a fuel cell which keeps the sealing properties reliably between a seal member and a separator with simple structure so as to obtain a desired performance of the power generation of the fuel cell.

According to first and second aspects of the invention, the separators are integrated with seal members for covering at least the surroundings of the electrodes and the communication holes, and the seal members include: body base portions having a trapezoidal-shaped cross-section; and a plurality of protruded portions being integrated with the leading ends of the body base portions.

In this manner, since the seal members are integrated with the separators so that sealing can be reliably achieved by sealing only the single surface. As compared with the structure of the seal members being provided on both sides of the separators, the assembling workability and the alignment condition can be significantly improved.

Moreover, the seal member is provided with a plurality of protruded portions at the leading end of the body base portion so that its contact area can be made larger than that of the single lip shape of the related art, which makes it possible to keep the desired sealing properties. Moreover, the individual protruded portions are made so relatively deformable that they can easily follow the height fluctuations of the seal member so as to keep the desired sealing properties with the simple structure. Therefore, the satisfactory sealing performance can also be obtained especially to the intrinsic phenomenon of the first and second metal separators to be deformed due to the gas pressure in the fuel cell, or the warp, swell or deformation of the surface. Moreover, the individual stacked power generating cells are improved in strength against a displacement so that they can be reliably held with each other.

In addition, the individual protruded portions can be easily deformed to apply the proper sealing surface pressure or the sealing line pressure, such as expressed by load per area (kg/m$^2$) or load per line length respectively, to the seal portions so that any excessive sealing surface pressure can not be produced. Therefore, the surface pressure distribution in the electrode surface can be properly kept to prevent effectively the various components including the electrolyte/electrode structure from being damaged.

Moreover, the body base portion is formed into the trapezoidal-shaped cross-section so that the spring constant can be enlarged to improve the desired strength (or toughness) of the seal member itself. When the fuel cells are stacked for use on the vehicle, therefore, it is possible to keep the strength as the structural body for the vehicle and the desired sealing properties and improve the resistances to vibrations and impacts.

In the state where the protruded portions are pressed to contact the seal member, still moreover, the leading end portion of the seal member can follow displacement of the seal member in the surface direction thereof (or the transverse direction) due to integral formation with the body base portion. Even the vibrations or impacts are applied, the desired sealing properties can be reliably kept.

In the fuel cell according to a third aspect of the invention, moreover, the separators are integrated with seal members for covering at least the surroundings of the electrodes and the communication holes, and the seal members include body base portions having a trapezoidal-shaped cross-section, and arcuate leading end portions made integral in a predetermined curvature with the leading ends of the body base portions and the material to make it is more deformable or softer than that of being adopted for forming the body base portions.

As compared with the single lip shape of the prior art, therefore, the contact area with the seal members can be increased to keep the desired sealing properties. Moreover, the arcuate leading end portions are so relatively deformable that they can easily follow the height fluctuations of the seal members thereby to prevent the desired sealing properties from degrading and to apply the proper sealing surface pressure (or the sealing line pressure) to the seal portions.

Moreover, the body base portions can improve the strength of the seal members themselves and can be crushed, when the vibrations, impacts and so on act, to prevent a clearance from being formed between the stacked power generating cells.

In the fuel cell according to a fourth aspect of the invention, still moreover, the separators are made of wave-shaped cross-sectional metal plates so that thickness of the separators can be readily reduced.

In the fuel cell according to a fifth aspect of the invention, furthermore, the arcuate leading end portions are provided with a plurality of protruded portions thereby to improve the sealing properties.

DESCRIPTION OF THE PREFERRED EMBODIMENTS

Figure 1:
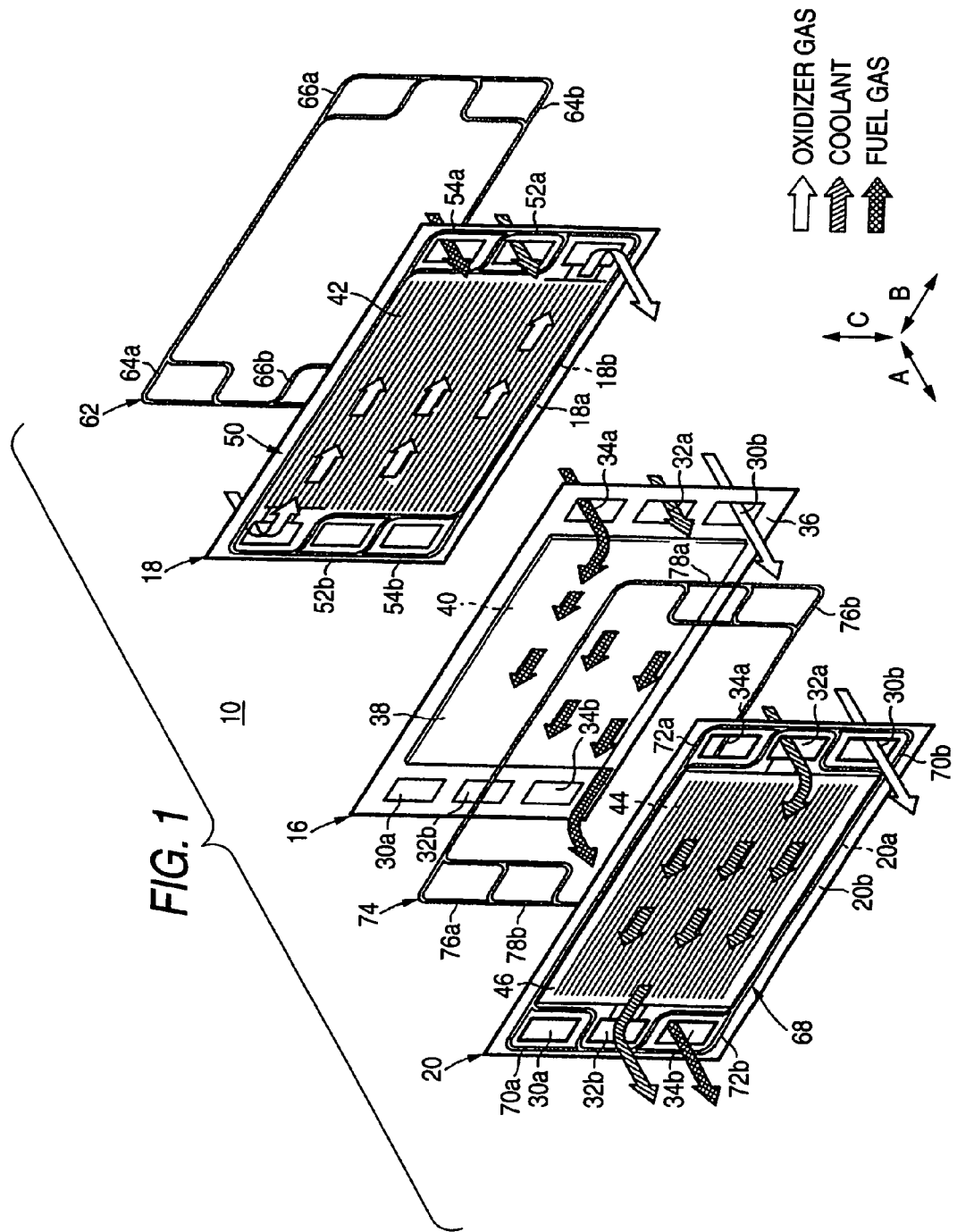
FIG. 1 is a perspective view of an essential portion of a fuel cell according to a first embodiment of the invention.
Figure 2:
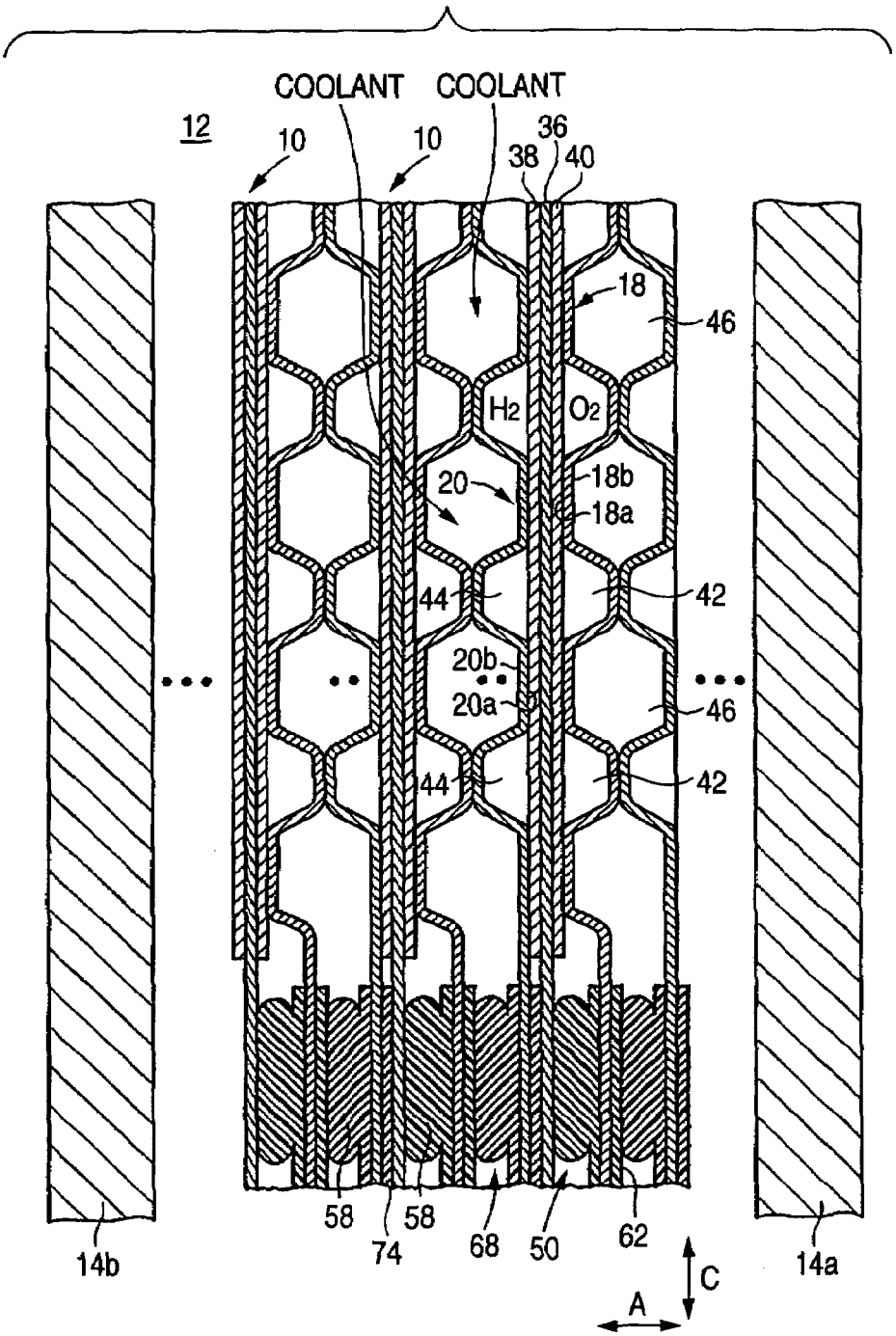
FIG. 2 is a cross-sectional view of an essential portion of a fuel cell stack having the stacked fuel cells.

FIG. 1 is an perspective view of an essential portion of a fuel cell 10 according to the first embodiment of the invention, and FIG. 2 is a cross-sectional view of an essential portion of a fuel cell stack 12 where the fuel cells 10 is stacked.

As shown in FIG. 2, the fuel cell stack 12 has a plurality of fuel cells 10 stacked in the direction of arrow A, with end plates 14a and 14b being arranged at both ends of the stacking direction. The end plates 14a and 14b are fixed by the tie rods (not-shown) so that a predetermined fastening load might be applied to the stacked fuel cells 10 in the direction of arrow A.

As shown in FIG. 1, the fuel cell 10 is structured by juxtaposing a 10 membrane electrode assembly (or an electrolyte/electrode structure) 16 with the first and the second metal separators 18 and 20 to be clamped in-between. These first and second metal separators 18 and 20 might be made of steel sheets, stainless steel sheets, aluminum sheets, plated steel sheets, or metal sheets with its metal surfaces being treated for corrosion resistance, for example where the thickness of 0.05 mm to 1.0 mm is given. Here, the first and second metal separators 18 and 20 may also be replaced by separators made of carbon.

At one end edge portion of the fuel cell 10 in the direction of arrow B (or in the horizontal direction of FIG. 1), there are provided in the direction of arrow C (or in the vertical direction) with an oxidizer gas entrance communication hole (or a reaction gas introducing communication hole) 30a for feeding an oxidizer gas such as an oxygen containing gas; a coolant exit communication hole (or a coolant discharging communication hole) 32b for discharging a coolant; and a fuel gas exit communication hole (or a reaction gas discharging communication hole) 34b for discharging a fuel gas such as a hydrogen containing gas. These oxidizer gas introducing communication hole 30a, coolant discharging communication hole 32b and fuel gas discharging communication hole 34b are made to be communicated in the fuel cell structure through in the stacking direction of arrow A.

On the contrary, at the other end edge portion of the fuel cell 10 in the direction of arrow B, there are provided, in the direction of arrow C, with a fuel gas entrance communication hole (or a reaction gas introducing communication hole) 34a for feeding the fuel gas, a coolant entrance communication hole (or a coolant introducing communication hole) 32a for feeding the coolant, and an oxidizer gas exit communication hole (or a reaction gas discharging communication hole) 30b for discharging the oxidizer gas in a manner to allow each of them to communicate in the direction of arrow A.

The membrane electrode assembly 16 is provided, for example, with a solid polymer electrolyte membrane 36 made of a thin membrane of perfluorosulfonic acid impregnated with water, and an anode electrode 38 and a cathode electrode 40 clamping said solid polymer electrolyte membrane 36.

The anode electrode 38 and the cathode electrode 40 are provided with a gas diffusion layer made of carbon paper or the like, and an electrode catalyst layer formed by coating uniformly the surface of the gas diffusion layer with porous carbon particles carrying an platinum alloy thereon. The electrode catalyst layer is jointed to the both sides of the solid polymer electrolyte membrane 36.

The first metal separator 18 is provided, on its surface 18a on the side of the electrolyte-membrane electrode assembly 16, with an oxidizer gas passage (or a reaction gas passage) 42 linearly extending in the direction of arrow B, for example. On the other hand, as shown in FIG. 1 and FIG. 2, the second metal separator 20 is provided, on its surface 20a being at the side of the electrolyte-membrane electrode assembly 16, with a fuel gas passage (or a reaction gas passage) 44 communicating with the fuel gas entrance communication hole 34a and the fuel gas exit communication hole 34b and linearly extending in the direction of arrow B.

Between the surface 18b of the first metal separator 18 and the surface 20b of the second metal separator 20, a coolant passage 46 is formed, to communicate with the coolant entrance communication hole 32a and the coolant exit communication hole 32b. This coolant passage 46 extends linearly in the direction of arrow B.

A first seal member 50 integrated to the surface 18a of the first metal separator 18, so as to cover the cathode electrode 40 where the oxidizer gas passage 42, the oxidizer gas entrance communication hole 30a and the oxidizer gas exit communication hole 30b are arranged on. The first seal member 50 might be made of a seal material, a cushion material or a packing material of EPDM, NBR, fluororubber, silicone rubber, phlorosilicone rubber, butyl rubber, natural rubber, stylene rubber, chloroprene or acrylic rubber, and it is set to have a hardness in a range from 30 degrees to 60 degrees.

The first seal member 50 is provided integrally or separately with seal portions 52a and 52b for shielding the coolant entrance communication hole 32a and the coolant exit communication hole 32b from the oxidizer gas passage 42, and seal portions 54a and 54b for shielding the fuel gas entrance communication hole 34a and the fuel gas exit communication hole 34b from the oxidizer gas passage 42.

Figure 3:
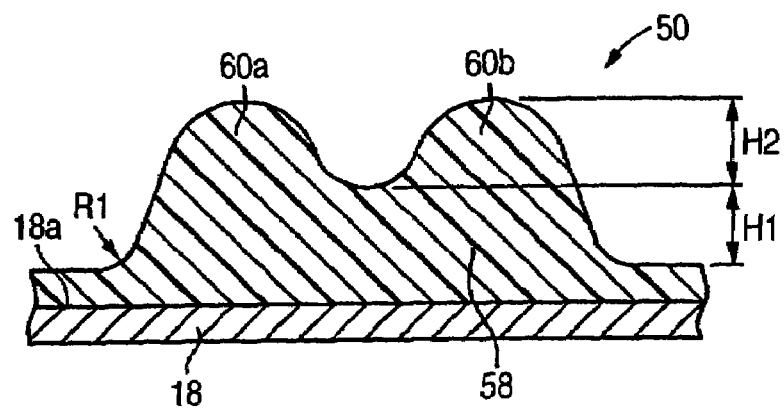
FIG. 3 is an explanatory cross-section of a seal member composing the fuel cell.

As shown in FIG. 2 and FIG. 3, the first seal member 50 is integrated with the surface 18a of the first metal separator 18, and said first seal member includes a body base portion 58 having a trapezoidal-shaped cross-section; and a plurality of protruded portions 60a and 60b such as to be integrated with the leading end of the body base portion 58. Here, the body base portion 58 may also be given a small parting gradient at the molding time.

As shown in FIG. 3, the body base portion 58 is set to have a height H1 for keeping a desired spring constant necessary for shock absorption, while the protruded portions 60a and 60b are set to have a height H2 for avoiding an abrupt change in the line pressure (or a sealing line pressure) of the seal portions as well as for keeping strength of the protruded portions 60a and 60b themselves. In order to prevent a stress concentration at the boundary of the body base portion 58, said boundary area is shaped to have a radius of curvature R1 set within a range of 0.3 mm to 1.0 mm.

A second seal member 62 is integrated to the surface 18b of the first metal separator 18, as shown in FIG. 1 and FIG. 2 so as to cover the coolant passage 46, the coolant entrance communication hole 32a and the coolant exit communication hole 32b. This second seal member 62 is provided integrally or separately with seal portions 64a and 64b for shielding the oxidizer gas entrance communication hole 30a and the oxidizer gas exit communication hole 30b from the coolant passage 46, and seal portions 66a and 66b for shielding the fuel gas entrance communication hole 34a and the fuel gas exit communication hole 34b from the coolant passage 46. The second seal member 62 is formed to have a rectangular cross-section.

A third seal member 68 is integrated to the surface 20b of the second metal separator 20, so as to cover the coolant passage 46, the coolant entrance communication hole 32a and the coolant exit communication hole 32b. This third seal member 68 is provided with seal portions 70a and 70b for shielding the oxidizer gas entrance communication hole 30a and the oxidizer gas exit communication hole 30b from the coolant passage 46, and seal portions 72a and 72b for shielding the fuel gas entrance communication hole 34a and the fuel gas exit communication hole 34b from the coolant passage 46.

This third seal member 68 is structured and formed in the same manner of the first seal member 50, of which detailed description will be omitted but their common components are designated by the common reference numerals.

A fourth seal member 74 is integrated to the surface 20a of the second metal separator 20 to cover the anode electrode 38, in other words, the fuel gas passage 44, the fuel gas entrance communication hole 34a and the fuel gas exit communication hole 34b. This fourth seal member 74 is provided with seal portions 76a and 76b for shielding the oxidizer gas entrance communication hole 30a and the oxidizer gas exit communication hole 30b from the fuel gas passage 44, and seal portions 78a and 78b for shielding the coolant entrance communication hole 32a and the coolant exit communication hole 32b from the fuel gas passage 44. This fourth seal member 74 is formed to have a rectangular cross-section such as already explained for the second seal member 62.

The operations of the fuel cell 10 that is made in the above mentioned manner thus structured will be described as below.

First of all, as shown in FIG. 1, the oxidizer gas entrance communication hole 30a is fed with an oxidizer gas such as an oxygen containing gas, and the fuel gas entrance communication hole 34a is fed with a fuel gas such as a hydrogen containing gas. Moreover, the coolant entrance communication hole 32a is fed with a coolant such as pure water, ethylene glycol or oil.

Therefore, the oxidizer gas is introduced from the oxidizer gas entrance communication hole 30a into the oxidizer gas passage 42 of the first metal separator 18 to be fed in the direction of arrow B to the cathode electrode 40 constructing the membrane electrode assembly 16. On the other hand, the fuel gas is introduced from the fuel gas entrance communication hole 34a into the fuel gas passage 44 of the second metal separator 20 and is fed, while flowing in the direction of arrow B, to the anode electrode 38 constructing the membrane electrode assembly 16.

In each membrane electrode assembly 16, therefore, the oxidizer gas fed to the cathode electrode 40 and the fuel gas fed to the anode electrode 38 are consumed to generate an electric power by the electrochemical reaction in the electrode catalyst layer.

Next, the fuel gas fed to and consumed in the anode electrode 38 is discharged in the direction of arrow A along the fuel gas exit communication hole 34b. Likewise, the oxidizer gas fed to and consumed in the cathode electrode 40 is discharged in the direction of arrow A along the oxidizer gas exit communication hole 30b.

On the other hand, the coolant fed to the coolant entrance communication hole 32a is introduced into the coolant passage 46 between the first and second metal separators 18 and 20, and then flows in the direction of arrow B. This coolant cools the membrane electrode assembly 16 and is then discharged from the coolant exit communication hole 32b.

In the case of the first embodiment, the first seal member 50 is integrated to the surface 18a of the first metal separator 18, and the first seal member 50 is provided with the body base portion 58 having the trapezoidal-shaped cross-section, and the protruded portions 60a and 60b integrated to the leading end of the body base portion 58.

Figure 4:
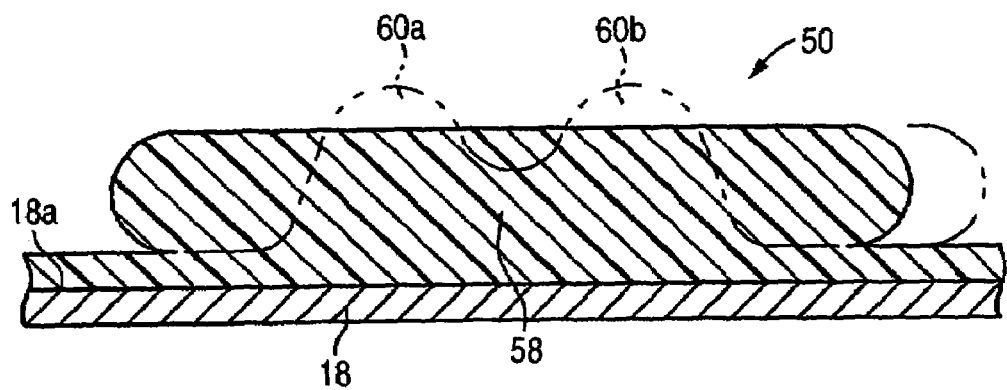
FIG. 4 is a cross-sectional view of the seal member in its operation.

Therefore, contact area of the sealed portion (i.e., the solid polymer electrolyte membrane 36) of the first seal member 50 is increased more than that of the lip-shaped seal member in the related art, and the desired seal properties can be thus obtained. Moreover, the individual protruded portions 60a and 60b are relatively deformable (as referred to a double-dotted line in FIG. 4) so that they can easily follow the height fluctuations of the seal portion whereby the desired seal properties can be obtained with the simple structure.

Therefore, satisfactory sealing performance can be expected especially to the intrinsic phenomenon of the first and second metal separators 18 and 20, such as the deformation caused by the gas pressure in the fuel cell 10, or the warp, swell or deformation of the surface.

Moreover, the individual protruded portions 60a and 60b can be easily deformed to apply a proper sealing surface pressure (or a sealing line pressure) to the seal members whereby any excessive sealing surface pressure can not be produced. As a result, significant effect can be obtained such that the surface pressure distributions in the electrode surfaces of the anode electrode 38 and the cathode electrode 40 can be properly maintained, and the various components including the membrane electrode structure 16 can be effectively prevented from being damaged.

Still further, the body base portion 58 is formed to have trapezoidal-shaped cross-section so that it can improve the strength (or toughness) of the first seal member 50 itself. Moreover, the individual protruded portions 60a and 60b of the first seal member 50 follow the seal member integrally in the surface direction thereof through the body base portion 58 while being pressed on the seal member. Even if vibrations or impacts are applied, therefore, the desired sealing properties can be reliably kept.

Having the above described fuel cell structure, when the fuel cells 10 are stacked for use on a vehicle, it is possible to obtain the desired sealing properties and to absorb the vibrations reliably while the vehicle is running, and against the impact or shock at an abrupt stopping or starting time. Therefore, significant effect can be obtained such that the resistances to vibrations and impacts can be improved.

As to the third seal member 68, it can achieve the same effects as those explained in the first seal member 50 so that its detailed description will not be repeated.

Figure 5:
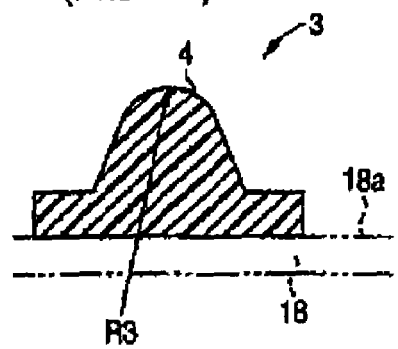
FIG. 5 is a cross-section of a lip shape portion of a seal member in related art for a comparison.

Next, experiments to compare the sealing properties in the case of a seal member 3 (as referred to FIG. 5) having a lip-shape seal member in the related art, with the case of the first embodiment in this invention. This seal member 3 was formed into a tapered shape having an arcuate leading end portion 4 of a radius of curvature R3 set at 0.1 mm to 1.0 mm.

Figure 6:
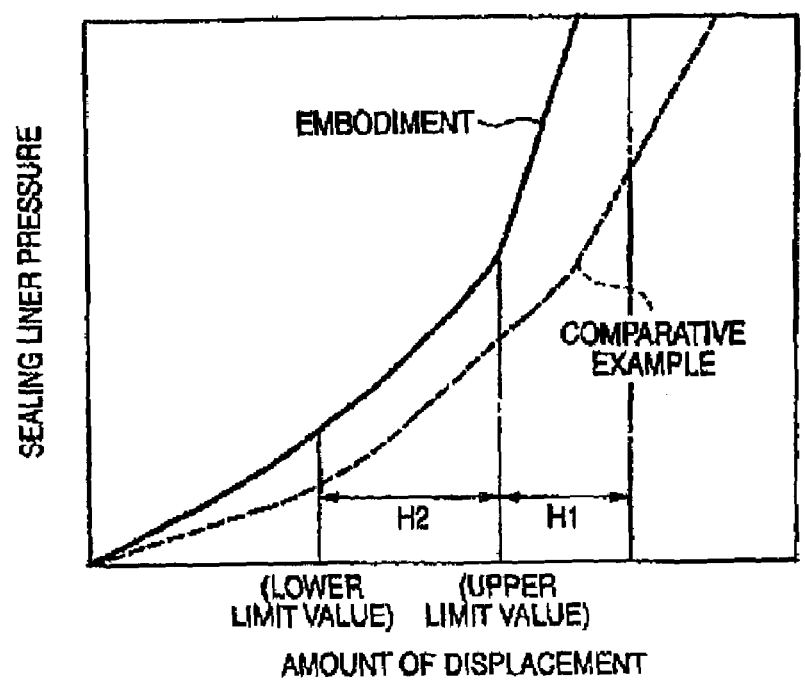
FIG. 6 is an explanatory diagram presenting relations between a displacement and a sealing line pressure between the comparison and the embodiment.

In said experiments, there were prepared a fuel cell (hereafter called as "Comparison") having the seal member 3 assembled therein, and the fuel cell 10 (hereafter called as "Embodiment") according to the first embodiment. The relations between the displacement and the sealing line pressure are detected, and the results as shown in FIG. 6 are obtained.

As the result, in "Comparison", the seal member 3 itself was easily deformable so that the sealing line pressure (or the sealing surface pressure) is expected to be reduced. In the case of "Embodiment", on the contrary, the desired sealing properties could be obtained in the range between the upper limit and the lower limit of the compressibility such as indicated by the height H2. In the case of "Embodiment", moreover, a proper seal pressure was obtained, and surface pressure distribution on the electrode surface was also in proper range. When the upper limit (i.e., the range of the height H1) of the compressibility was exceeded, the spring constant of Embodiment could be improved to keep the desired strength (or toughness) although the seal member 3 of Comparison was excessively crushed.

Figure 7:
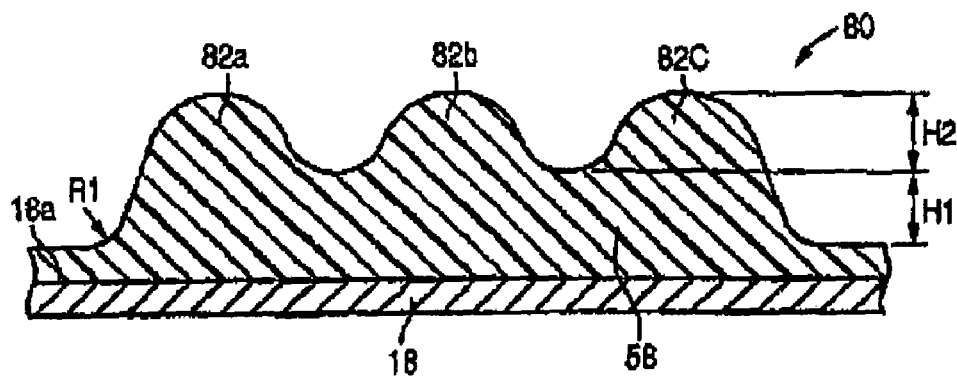
FIG. 7 is an explanatory cross-section of a seal member used for a fuel cell according to a second embodiment of the invention.

FIG. 7 is a cross-sectional view of a seal member 80 that is used for the fuel cell according to a second embodiment of the invention.

The seal member 80 is integrated to the surface 18a of the first metal separator 18, which is provided with the body base portion 58 having a trapezoidal-shaped cross-section, and a plurality of, e.g., three protruded portions 82a, 82b and 82c integrated to the leading end of the body base portion 58.

The body base portion 58 is set to have the height H1 for keeping the desired spring constant necessary for the impact absorptions or the like. On the other hand, the protruded portions 82a, 82b and 82c are set to have the height H2 for preventing the line pressure of the seal member from abruptly changing and for keeping the strengths of the protruded portions 82a, 82b and 82c themselves.

In the second embodiment thus structured in the above, the protruded portions 82a, 82b and 82c can keep not only the contact areas with the seal member effectively but also the desired sealing properties in a manner to follow the fluctuations of the height of the seal member. Moreover, the body base portion 58 can improve the desired strength (or toughness) to be coped with the excessive crush of the seal member 80 itself, so that the same effects as those in the first embodiment can be also attained.

Figure 8:
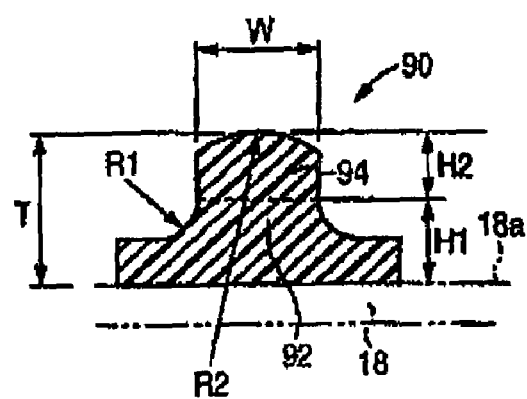
FIG. 8 is an explanatory cross-section of a seal member used for a fuel cell according to a third embodiment of the invention.
Figure 9:
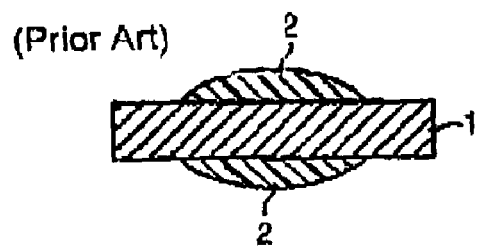
FIG. 9 is an explanatory cross-section of a seal member according to a related art.

FIG. 8 is an explanatory cross-section of a seal member 90, which is used for the fuel cell according to a third embodiment of the invention.

The seal member 90 is integrated with the surface 18a of the first metal separator 18, which is provided with a body base portion 92 having a trapezoidal-shaped cross-section, and an arcuate leading end portion 94 integrated in a predetermined curvature with the leading end of the body base portion 92 and made softer than the body base portion 92. Specifically, the arcuate leading end portion 94 is made of a composite material, which is prepared by mixing a material of a lower hardness than that making the body base portion 92.

A radius of curvature R2 of the arcuate leading end portion 94 is set within a range of 1.0 mm to 3.0 mm, and the aspect ratio T/W of the seal member 90, that is, the ratio of the height size T of the arcuate leading end portion 94 to the width size W of the body base portion 92 is set to a relation of T/W≦1.5. The body base portion 92 is set to the height H1, and the arcuate leading end portion 94 is set to the height H2.

In the third embodiment thus structured in the above, the arcuate leading end portion 94 can effectively maintain the contact area with the seal member. At the same time, the arcuate leading end portion 94 is made softer than the body base portion 92 so that it can follow the height fluctuations of the seal member thereby to keep the desired sealing properties. Moreover, the body base portion 92 can improve the desired strength (or toughness) against the excessive crush of the seal member 90 itself, so that effects like those of the first and second embodiments can be attained.

Here, the arcuate leading end portion 94 may also be provided with a plurality of (not-shown) protruded portions. As a result, the third embodiment can attain an effect of the sealing properties of the seal member 90 being more improved.

In the fuel cell according to the invention, the seal member is provided with a plurality of protruded portions at the leading end of the body base portion so that its contact area can be made larger than that of the single lip shape of the related art whereby the desired sealing properties can be obtained. Moreover, the individual protruded portions are made so relatively deformable that they can easily follow the height fluctuations of the seal member thereby to keep the desired sealing properties with the simple structure. Therefore, the satisfactory seal performance can also be shown especially against the intrinsic phenomenon to the first and second metal warp, swell or deformation of the surface. Moreover, the individual stacked power generating cells are improved in strength against a displacement so that they can be reliably held with each other.

In addition, the individual protruded portions can be easily deformed to apply the proper sealing surface pressure (or the sealing line pressure) to the seal portions so that no excessive sealing surface pressure is built up. Therefore, the surface pressure distribution in the electrode surface can be properly kept to prevent effectively the various parts including the electrolyte/electrode structure from being damaged.

Moreover, the body base portion is formed into the trapezoidal-shaped cross-section so that it can improve the desired strength (or toughness) of the seal member against the excessive crush. When the fuel cells are stacked for use on a vehicle, therefore, it is possible to retain the desired sealing properties and to improve the resistances to vibrations and impacts.

In the state where the protruded portions are pressed to contact the seal member, still moreover, the leading end portion of the seal member can follow the surface direction (or the transverse direction) of the seal member integrally with the body base portion. Even the vibrations or impacts are applied, therefore, the desired sealing properties can be reliably kept. material more deformable than that of said body base portion.

What is claimed is:

1. A fuel cell comprising:
an electrolyte/electrode structure having an electrolyte being arranged between a pair of electrodes, and
a plurality of metal separators being stacked on said electrolyte/electrode structure, each of said plurality of separators including reaction gas passages formed on one side thereof for feeding a reaction gas in the surface direction of said electrodes, said reaction gas passages being communicated with communication holes including at least a reaction gas introducing communication hole and a reaction gas discharging communication hole extending in the stacking direction, wherein
said separators are integrated with seal members so as to cover at least surroundings of said electrodes and said communication holes; wherein
one of said seal members includes a body base portion having a single trapezoidal-shaped cross-section and a plurality of protruded portions integrated with a leading end of said body base portion, said protruded portions including upper ends and a lower end where a height between the lower end and one of the upper ends is equal to a height between the lower end and another one of the upper ends, said trapezoidal-shaped cross-section of said body base portion rising to a height to contact the lower end of said pair of said protruded portions, said leading end of said trapezoidal-shaped cross-section of said body base portion integrating smoothly with one of said protruded portions; wherein
said plurality of protruded portions form greater contact area between said one seal member and a sealing surface; and wherein
said body base portion is connected to said plurality of protruded portions by a curved portion, the curved portion has a radius of curvature in a range of 0.3 mm to 1.0 mm to prevent stress concentration during sealing.

2. A fuel cell comprising:
an electrolyte/electrode structure having an electrolyte being arranged between a pair of electrodes, and
a plurality of metal separators being stacked on said electrolyte/electrode structure, each of said plurality of separators including coolant passages formed on one side thereof for feeding a coolant in the surface direction of said electrodes, said coolant passages being communicated with communication holes including at least a coolant introducing communication hole and a coolant discharging communication hole extending in the stacking direction, wherein
said separators are integrated with seal members so as to cover at least surroundings of said electrodes and said communication holes; wherein
one of said seal members includes a body base portion having a trapezoidal-shaped cross-section and a plurality of protruded portions integrated with a leading end of said body base portion, said protruded portions including upper ends and a lower end, said trapezoidal-shaped cross-section of said body base portion rising to a height to contact the lower end of said pair of said protruded portions, said leading end of said trapezoidal-shaped cross-section of said body base portion integrating smoothly with one of said protruded portions; wherein
said plurality of protruded portions form greater contact area between said one seal member and a sealing surface; and wherein
said body base portion is connected to said plurality of protruded portions by a curved portion, the curved portion has a radius of curvature in a range of 0.3 mm to 1.0 mm to prevent stress concentration during sealing.

3. A fuel cell comprising:
an electrolyte/electrode structure having an electrolyte being arranged between a pair of electrodes, and
a plurality of metal separators being stacked on said electrolyte/electrode structure, each of said plurality of separators including reaction gas passages formed on one side thereof for feeding a reaction gas in the surface direction of said electrodes and coolant passages formed on the other side thereof for feeding a coolant in the surface direction of said electrodes, said reaction gas passages being communicated with communication holes including at least a reaction gas introducing communication hole and a reaction gas discharging communication hole extending in the stacking direction, and said coolant passages being communicated with communication holes including at least a coolant introducing communication hole and a coolant discharging communication hole extending in the stacking direction wherein
said separators having seal members thereon so as to cover at least surroundings of said electrodes and said communication holes
said separators being a different material than said seal members, the seal members being made of a deformable material; wherein
one of said seal members includes a body base portion having a trapezoidal-shaped cross-section and a plurality of protruded portions having arcuate leading end portions with a predetermined curvature, the curvature being integrated with leading ends of said body base portion, said protruded portions being made of a material more deformable than that of said body base portion, said protruded portions including upper ends and a lower end, said trapezoidal-shaped cross-section of said body base portion rising to a height to contact the lower end of said pair of said protruded portions, said leading ends of said trapezoidal-shaped cross-section of said body base portion integrating smoothly with said protruded portions; wherein said plurality of protruded portions form greater contact area between said one seal member and a sealing surface; and wherein said body base portion is connected to said plurality of protruded portions by a curved portion, the curved portion has a radius of curvature in a range of 0.3 mm to 1.0 mm to prevent stress concentration during sealing.

4. A fuel cell according to claim 1, wherein said separators are made of wave-shape metal plates.

5. A fuel cell according to claim 3, wherein said arcuate leading end portions are provided with a plurality of protruded portions.

6. A fuel cell comprising:
an electrolyte/electrode structure having an electrolyte being arranged between a pair of electrodes;
a plurality of metal separators being stacked on said electrolyte/electrode structure, each of said plurality of separators including reaction gas passages formed on one side thereof for feeding a reaction gas in the surface direction of said electrodes, and
seal members which seal the separators, wherein
one of said seal members includes a body base portion having a trapezoidal-shaped cross-section and a plurality of protruded portions integrated with a leading end of said body base portion, said protruded portions including upper ends and a lower end, said trapezoidal-shaped cross-section of said body base portion rising above said base to a height to contact the lower end of said pair of said protruded portions, said leading end of said trapezoidal-shaped cross-section of said body base portion integrating smoothly with one of said protruded portions; wherein said plurality of protruded portions form greater contact area between said one seal member and a sealing surface; and wherein said body base portion is connected to said plurality of protruded portions by a curved portion, the curved portion has a radius of curvature in a range of 0.3 mm to 1.0 mm to prevent stress concentration during sealing.

7. A fuel cell according to claim 6, wherein said seal members are integrated to said separators.

8. A fuel cell according to claim 6, wherein said separators are made of wave-shaped metal plate.

9. The fuel cell according to claim 1, wherein said body base portion and said protruded portions are deformable such that said protruded portions being made of a material more deformable than that of said body base portion.

10. The fuel cell according to claim 2, wherein said body base portion and said protruded portions are deformable such that said protruded portions being made of a material more deformable than that of said body base portion.

11. The fuel cell according to claim 6, wherein said body base portion and said protruded portions are deformable such that said protruded portions being made of a material more deformable than that of said body base portion.

* * * * *

UNITED STATES PATENT AND TRADEMARK OFFICE
CERTIFICATE OF CORRECTION

| | | |
|---|---|---|
| PATENT NO. | : 7,674,550 B2 | Page 1 of 1 |
| APPLICATION NO. | : 10/839547 | |
| DATED | : March 9, 2010 | |
| INVENTOR(S) | : Wakahoi et al. | |

It is certified that error appears in the above-identified patent and that said Letters Patent is hereby corrected as shown below:

On the Title Pg, Item (30) Foreign Application Priority Data is missing should read --May 08, 2003 (JP) ............................. 2003-130465--

Signed and Sealed this

Twenty-fourth Day of August, 2010

David J. Kappos
*Director of the United States Patent and Trademark Office*